(No Model.)
J. H. CHAMBERS.
COFFIN.
No. 382,136. Patented May 1, 1888.
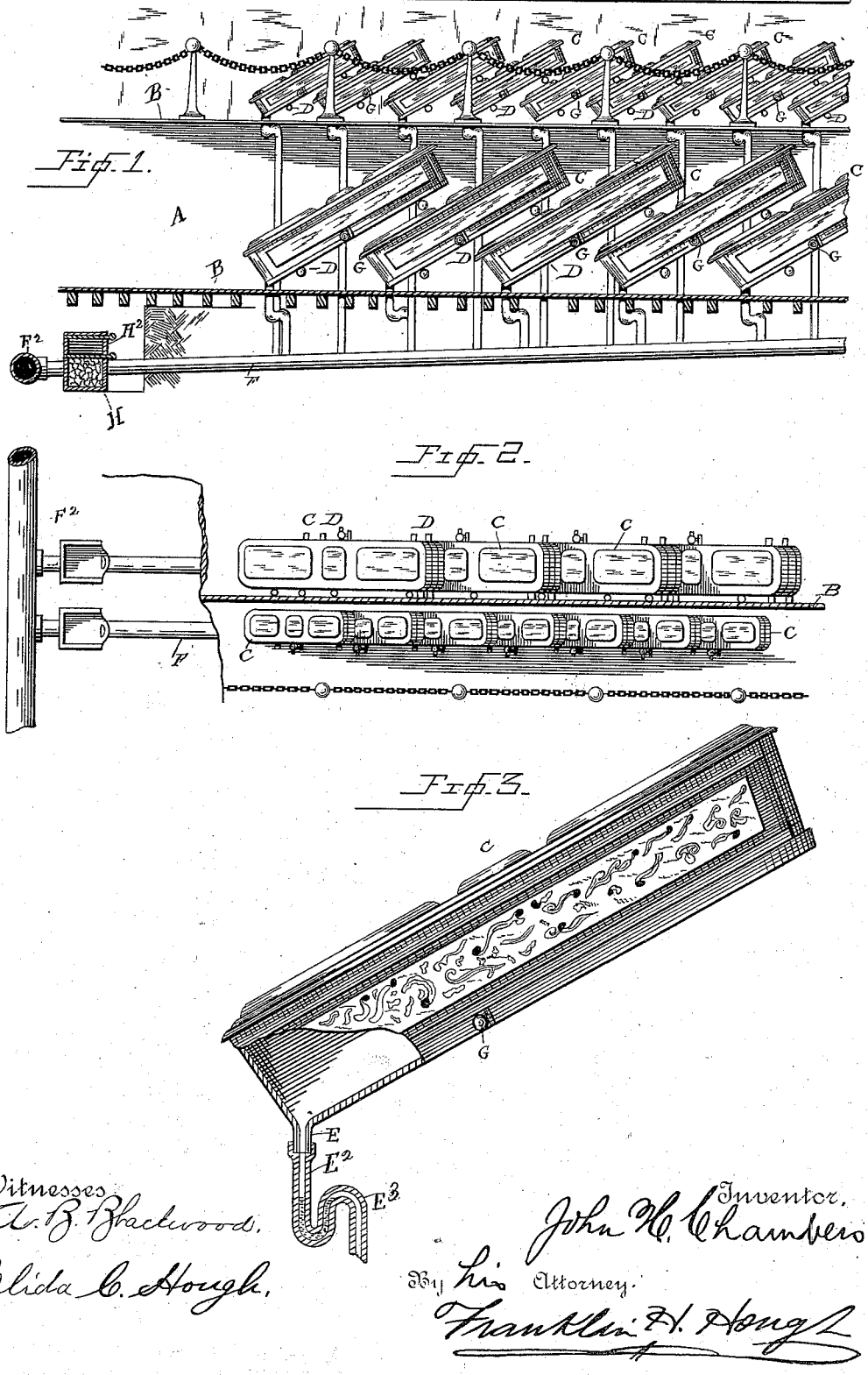
Witnesses
A. B. Blackwood.
Elida C. Hough.
Inventor,
John H. Chambers.
By his Attorney,
Franklin H. Hough

UNITED STATES PATENT OFFICE.

JOHN H. CHAMBERS, OF SCHENECTADY, NEW YORK.

COFFIN.

SPECIFICATION forming part of Letters Patent No. 382,136, dated May 1, 1888.

Application filed January 9, 1888. Serial No. 260,203. (No model.)

*To all whom it may concern:*

Be it known that I, JOHN H. CHAMBERS, a citizen of the United States, residing at Schenectady, in the county of Schenectady and State of New York, have invented certain new and useful Improvements in Apparatus for Use in Preserving the Dead; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the preservation of the dead; and it has for its object to provide an apparatus for use in connection with a system or method of treating the bodies of human beings after death so as to preserve a life-like appearance for an indefinite period of time. The system or method referred to forms the subject-matter of a separate application for a patent, which application was filed in the United States Patent Office October 27, 1887.

A further object of my invention is to provide an apparatus by the use of which the bodies of the dead may be disposed of without in any manner injuriously affecting the sanitary conditions of the vicinity.

To these ends, and to such others as the invention may relate, the same consists in the peculiar combinations and in the novel construction, arrangement, and adaptation of parts, all as more fully hereinafter described, shown in the drawings, and then specifically defined in the claims.

It is well known that the human body is composed largely of water and that during the earlier stages of decomposition this liquid is separated from the more solid portions. A serious objection to the various methods of burying or otherwise disposing of the dead as heretofore practiced has been due to the fact that no means have been provided for disposing of the liquid substance which accumulates within the casket or other chamber containing the body, serving at once to both discolor and hasten the decomposition and to endanger the health of persons living in the vicinity.

In the accompanying drawings, Figure 1 represents a longitudinal section through a building fitted with appliances for treating the bodies of the dead in accordance with my invention. Fig. 2 is a top plan of one of the partitions of the building with the caskets in position, the gallery being removed from one of the sides of the partition, so as to show the arrangement of the lower tier of caskets. Fig. 3 is an enlarged view of one of the caskets with its attachments.

Reference being had to the details of the drawings, A represents a suitable building provided at intervals with partitions B B.

C C are caskets or coffins resting upon pins or other suitable supports, D, and inclined at an angle, as shown.

E is an outlet-pipe connecting with the interior of the casket at the lower end of the same.

$E^2$ is a pipe connected at its upper end by means of any suitable form of joint with the outlet-pipe E. This pipe $E^2$ is bent at a point near its upper end, so as to form a double curve or "goose-neck," $E^3$, and at its lower end it connects with the pipe F, for a purpose which will presently appear. The curved portion $E^3$ of the pipe is filled with any suitable disinfectant, which may be renewed at any time either by severing the connection of the pipes at the outlet or by means of a valve at the side of the casket, as shown at G.

It will be at once evident that a series of caskets may be arranged in close proximity to each other, and each may be provided with outlets communicating with the pipe F, as shown and described.

The pipe F should be placed at a sufficient angle to permit any liquid substance which it may contain to flow freely through it, and it should be provided at its lower end with a suitable chamber, H, for the reception of a quantity of alum or other disinfecting substance in a solid form. Access to the chamber may be had by means of a suitable trap or cover, $H^2$, and a pipe-connection is established between the chamber and a larger pipe, $F^2$, which may be extended to a point below what is commonly termed the "water-line" of the earth.

In carrying out my system the body is first embalmed by any one of the well-known systems of embalming, and it is then placed within a suitable casket or other inclosing-chamber arranged as I have described. As the process of decomposition advances, the liquids find a ready outlet through the outlet-pipes, and after having passed through the chambers containing the disinfectants they are conveyed by means of the sewer-pipe to a point far below the surface of the earth after having been thoroughly disinfected. The solid portions of the body being thus relieved of the liquid mass of corruption with which it would otherwise have been surrounded will retain a life-like appearance for an indefinite length of time.

If desired, a large number of bodies may be deposited within a small compass. Instead of using a building a single story in height, the building may be two or more stories high and divided by means of partitions, so as to allow a sufficient space only to permit of a passage-way between the caskets, and by providing each partition with a gallery suitable for the reception of smaller caskets the bodies may be inspected at any time or removed when desired, and the expense, as compared with the cost of maintaining a burial-place in a cemetery, would be trifling.

While I have described a building constructed with special reference to the carrying out of my system, I do not wish to be limited in its application to the use of such building, as it is evident that the system is equally well adapted to use in connection with any of the various forms of vaults or graves, and, if desired, the casket may be placed in a horizontal position and pipe-connection be established with the bottom instead of the end of the same.

Having thus described my invention and set forth its merits, what I claim to be new, and desire to secure by Letters Patent, is—

1. The combination, with a plurality of caskets and the conductor leading to a point below the surface of the earth, of pipe-connections between said caskets and conductor, substantially as and for the purpose described.

2. The combination, with the casket and conductor leading to a point below the surface of the earth, of a pipe-connection between said casket and conductor and a disinfectant-seal in said connection, substantially as and for the purpose described.

In testimony whereof I affix my signature in presence of two witnesses.

JOHN H. CHAMBERS.

Witnesses:
ELIDA C. HOUGH,
ALFRED T. GAGE.